United States Patent
Karp et al.

(10) Patent No.: US 7,107,591 B1
(45) Date of Patent: Sep. 12, 2006

(54) TASK-SPECIFIC FLEXIBLE BINDING IN A SOFTWARE SYSTEM

(75) Inventors: Alan H. Karp, Palo Alto, CA (US); Rajiv Gupta, Los Altos, CA (US); Arindam Banerji, Sunnyvale, CA (US); Chia-Chiang Chao, Saratoga, CA (US); Ernest Mak, Fremont, CA (US); Sandeep Kumar, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/186,450

(22) Filed: Nov. 5, 1998

(51) Int. Cl.
*G06F 9/00* (2006.01)
(52) U.S. Cl. ........................ 718/104; 718/100
(58) Field of Classification Search ............... 709/100, 709/104; 719/331, 332; 718/100, 104; 707/1, 707/8, 9
See application file for complete search history.

(56) References Cited

U.S. PATENT DOCUMENTS

| | | | | |
|---|---|---|---|---|
| 5,579,518 A | * | 11/1996 | Yasumatsu | 717/131 |
| 5,603,020 A | * | 2/1997 | Hashimoto et al. | 395/616 |
| 5,623,600 A | * | 4/1997 | Ji et al. | 713/201 |
| 5,761,507 A | * | 6/1998 | Govett | 395/684 |
| 5,790,853 A | * | 8/1998 | Nomura et al. | 718/104 |
| 6,006,171 A | * | 12/1999 | Vines et al. | 702/184 |
| 6,044,379 A | * | 3/2000 | Callsen | 707/103 R |
| 6,058,426 A | * | 5/2000 | Godwin et al. | 709/229 |
| 6,085,030 A | * | 7/2000 | Whitehead et al. | 709/203 |
| 6,122,663 A | * | 9/2000 | Lin et al. | 709/224 |
| 6,263,379 B1 | * | 7/2001 | Atkinson et al. | 719/332 |

\* cited by examiner

*Primary Examiner*—William Thomson
*Assistant Examiner*—Andy Ho

(57) ABSTRACT

A software system with task-specific flexible bindings that enhance the ability to dynamically add and remove resources from availability to tasks and that eliminates the need for coordination of globally unique names. The software system includes a task-specific name space which corresponds to a task executing in the software system. The task-specific name space holds flexible bindings each of which associates a task-specific name used by the task to refer to a desired resource or a set of one or more resources of the computer system and to information that describes the desired resource. The software system includes a resource mediator that obtains a message from the task. The resource mediator keeps information for each resource that identifies a resource handler task for the desired resource by resolving the task-specific name using the flexible binding.

36 Claims, 6 Drawing Sheets

TASK-SPECIFIC FLEXIBLE BINDING IN A SOFTWARE SYSTEM

BACKGROUND OF THE INVENTION

1. Field of Invention

The present invention pertains to the field of software systems. More particularly, this invention relates to providing task-specific flexible bindings in a software system.

2. Art Background

Software programs executing on a computer system commonly make use of resources available with the computer system. Such resources commonly include resources such as files, data bases, and application programs. Such resources also commonly include resources such as storage devices, printers, communication devices, and display devices to name only a few example devices. Such resources may be local resources of the computer system or may be remote resources accessible via a network connection to one or more other computer systems. A software program executing on the computer system that accesses resources is hereinafter referred to as a task.

Typically, a task refers to a resource using a resource name. The resource name is usually associated or bound to the resource. Prior computer systems typically include an operating system that binds the resource name used by a task to an internal representation for the corresponding resource. The internal representation usually provides information that enables the operating system to identify the corresponding resource. For example, the Unix operating system provides bindings between file names used by tasks and inode numbers which are used to identify the physical locations of the corresponding files on a physical storage media.

Unfortunately, such inflexible name bindings provided in prior systems usually limit the ability of tasks to access resources in a distributed system that includes multiple computer systems. In addition, such prior systems usually require extensive coordination of global resource names across distributed computer systems. Moreover, such prior systems usually limit the ability of resources to be dynamically added and removed from availability to the tasks.

SUMMARY OF THE INVENTION

A software system is disclosed which provides task-specific flexible bindings that greatly enhance the ability to dynamically add and remove resources from availability to tasks and that eliminates the need for coordination of globally unique names. The software system provides a method for identifying desired resources rather than inflexibly binding names to resources.

The software system includes a task-specific name space which corresponds to a task executing in the software system. The task-specific name space holds flexible bindings each of which associates a task-specific name used by the task to refer to a desired resource or a set of one or more resources of the computer system and to information that describes the desired resource. The software system includes a resource mediator that obtains a message from the task. The resource mediator keeps information for each resource that identifies a resource handler task for the desired resource by resolving the task-specific name using the flexible binding.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
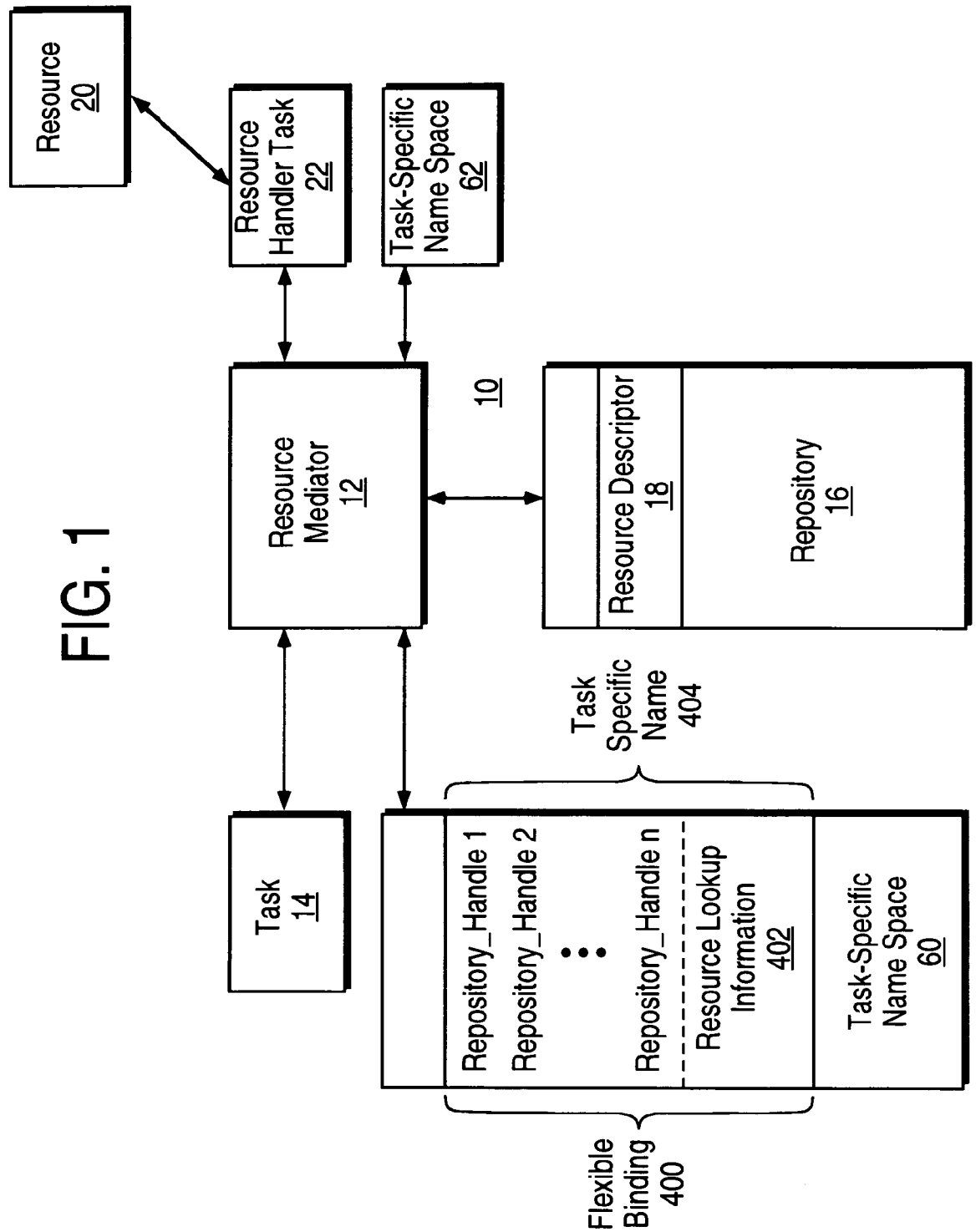
FIG. 1 illustrates a software system that provides task-specific flexible name bindings.

FIG. 1 illustrates a software system 10 that provides task-specific flexible bindings. The software system 10 includes a resource mediator 12 that maintains task-specific name spaces for tasks executing in the software system 10. For example, the resource mediator 12 maintains a task-specific name space 60 for a task 14 and maintains a task-specific name space 62 for a resource handler task 22.

The task 14 represents any software element that makes use of resources such as a resource 20. The requesting task 14 may be an application program executing in the software system 10. The requesting task 14 may also be a process executing in the software system 10 such as a user interface process that enables a user to launch and interact with various resources in the software system 10.

The resource 20 represents any local or remote resource which may be associated with the software system 10. The resource 20 may be a software resource such as a file, a database, a process, or an application program to name a few examples. The resource 20 may be hardware resource such as a memory segment, a storage device, a printer or other output device, a communication device, an input device, or a display device to name only a few examples.

The task-specific name space 60 holds flexible bindings for the task-specific names which the task 14 uses to refer to resources. For example, the task-specific name space 60 holds a flexible binding 400 that associates a task-specific name 404 to a set of n repository handles (repository_handle 1-$n$) and to an optional set of resource lookup information 402. The task-specific name 404 is a local name used by the task 14 to refer to a resource. Each repository_handle 1-$n$ is a reference to a resource descriptor contained in a repository 16.

In general, each resource descriptor in the repository 16 corresponds to a resource which is accessible through the resource mediator 12. Each resource descriptor in the repository 16 includes information that identifies the resource handler task for the corresponding resource and includes a set of attributes that describe the corresponding resource and includes other information regarding the corresponding resource. For example, a resource descriptor 18 corresponds to the resource 20 and identifies the resource handler task 22 as the resource handler task for the resource 20 and includes a set of attributes that describe the resource 20. The repository 16 also holds resource descriptors for the task-specific name spaces 60–62 and identifies the resource mediator 12 as the resource handler for the task-specific name spaces 60–62.

The resource lookup information 402 provides a way of binding a task-specific name to a description of a resource rather than an explicit binding as is provided by the repository_handles 1-n. The resource lookup information 402 is a description of a desired resource and how to find a provider of the desired resource. A provider is a machine that will provide the desired resource to a requester. The resource mediator 12 uses the resource lookup information 402 to bind the task-specific name 404 by comparing the resource lookup information 402 to the attributes of the resource descriptors in the repository 16.

In one embodiment of the software system 10, communication between the resource mediator 12 and the task 14 and the resource handler task 22 is accomplished using a in-box/out-box messaging structure. The task 14 has an out-box for providing messages to the resource mediator 12. The out-box of the task 14 holds outgoing messages each of which includes an envelope and a payload. In addition, the task 14 may have one or more in-boxes for holding incoming messages from the resource mediator 12. Similarly, the resource handler task 22 has an out-box to the resource mediator 12 and one or more in-boxes for holding messages from the resource mediator 12.

A message in an outbox from the task 14 may include a payload which is to be transferred to a resource handler for a primary resource specified in the message. In response, the resource mediator 12 resolves the task-specific name for the primary resource and forwards the message to a resource handler for the primary resource. The envelope of the message includes a task-specific name for a primary resource of the message and a task-specific name for a name space which is to be used to resolve the task-specific name of the primary resource. Also included is a binding-type indicator that informs the resource mediator 12 of how to resolve the task-specific name of the primary resource which is a designated resource in the outbox envelope.

Alternatively, a message in an outbox from the task 14 may be a message that is used to resolve a task-specific name of a primary resource contained in the message. The envelope of the message includes a task-specific name for the primary resource and a task-specific name for a name space which is to be used to resolve the task-specific name of the primary resource. The envelope also includes a binding-type indicator that informs the resource mediator 12 of how to resolve the task-specific name of the primary resource. This resolution may includes selecting from one of a number of providers of the primary resource which is a process called arbitration. In response, the resource mediator 12 resolves the task-specific name for the primary resource. The task 14 may subsequently generate a follow up message that specifies the task-specific name of the primary resource and that includes a payload which is to be transferred to a resource handler for the primary resource. The resource mediator 12 forwards the follow up message to the resource handler for the primary resource.

The following focuses on a message from the task 14 with an envelope that specifies the task-specific name 404 for the primary resource and specifies the task-specific name space 60 to be used to resolve the task-specific name 404.

The binding-type indicators include an indication that the resource mediator 12 should use tight binding when resolving a task-specific name. In response, the resource mediator 12 uses the repository_handles 1-n to resolve the task-specific name 404. If more than one of the repository_handles 1-n is listed in the flexible binding 400, i.e. if n>1, then the resource mediator 12 uses a specified arbitration policy which is specified in the message to select one or more of the repository_handles 1-n when resolving the task-specific name 404. An example of an arbitration policy is to select the first repository_handles 1-n. Another example is to select a random one of the repository_handles 1-n. A selected one of the repository_handles 1-n is then used to obtain a resource descriptor from the repository 16 and identify the appropriate resource handler task.

The binding-type indicators include an indication that the resource mediator 12 should use flexible binding when resolving a task-specific name. In response, the resource mediator 12 resolves the task-specific name 404 by searching the repository 16 for resource descriptors whose attributes match the resource lookup information 402. If more than one resource descriptor matches the resource lookup information 402 then the resource mediator 12 uses a specified arbitration policy to select one. The selected resource descriptor identifies the appropriate resource handler task. An example of an arbitration policy is to select the first resource descriptor that matches. Another example is to select a random resource descriptor that matches.

The binding-type indicators include an indication that causes the resource mediator 12 to use tight binding to resolve the task-specific name 404 if any of the resources referenced by the repository_handles 1-n are available and to use flexible binding otherwise. This will handle cases in which resources previously bound to the task-specific name 404 are later removed from the repository 16 or are made invisible to the task 14.

The binding-type indicators include an indication that the resource mediator 12 should use flexible binding to update the list of tightly bound resources when resolving a task-specific name. In response, the resource mediator 12 when resolving the task-specific name 404 searches the repository 16 for resource descriptors whose attributes match the resource lookup information 402 and then binds the matching resource descriptors to the task-specific name 404 using additional ones of the repository_handles 1-n. This will enable the task 14 to see new resources that match the resource lookup information 402 as they become available.

The binding-type indicators include an indication that the resource mediator 12 should remove any tight bindings to resources that are not currently available when resolving a task-specific name. In response, the resource mediator 12 when resolving the task-specific name 404 obtains the resource descriptors referenced by the repository_handles 1-n from the repository 16 and analyzes the resource descriptors to determine whether those resources are still available to the task 14. For example, a resource may have become unavailable to the task 14 by applying certain access rules specified in the corresponding resource descriptor. Any that are unavailable are removed from the list of the repository_handles 1-n. Other binding types may also be employed.

The resource descriptors in the repository 16 have a uniform structure for all types of resources including files, processes, computers, etc, and additional tasks and components. For example, the resource descriptor 18 for the resource 20 has the same structure whether the resource 20 is a file, a process, or a device. The resource descriptor 18 is created when the resource handler task 22 registers the resource 20 to the resource mediator 12.

The resource handler task 22 manages the resource 20 and includes driver routines adapted to the particulars of the resource 20. For example, if the resource 20 is a file, the resource handler task 22 includes driver routines for reading and writing file data to and from the physical medium that holds the file. The resource handler task 22 makes the resource 20 available by registering the resource 20 to the resource mediator 12. The resource handler task 22 may execute on the same computer system as the resource mediator 12 or on a different computer system with appropriate interconnect to the resource mediator 12.

Each resource descriptor in the repository 16 includes a set of meta-data fields along with a resource-specific data field. The meta-data fields include a resource handler field and an attributes field, as well as other fields.

The meta-data fields of a resource descriptor in the repository 16 include a resource handler field that holds the name of a resource handler task that is associated with the corresponding resource. For example, the resource handler field of the resource descriptor 18 contains a reference to the resource handler task 22. The resource mediator 12 uses the resource handler field of a resource descriptor to determine where to forward messages that are targeted for the corresponding resource.

The meta-data fields of a resource descriptor in the repository 16 include an attribute field which holds a set of attributes that describe the corresponding resource. These attributes may be used by the resource mediator 12 when resolving the task-specific name 404 by matching the resource lookup information 402 to the attributes fields in the repository 16.

Table 1 is an example of some of the information registered in the resource descriptor 18 for an example in which the resource 20 is a file.

TABLE 1

| Repository Handle | 859 |
| Resource Handler: | 3482 |
| Attributes: | DESC = "my data" |
| RSD: | /u/user/report.txt |

The repository handle of 859 is generated by the resource mediator 12 when the resource handler task 22 registers the resource 20. The resource handler field of the resource descriptor 18 holds a handle of 3482 which is associated with the resource handler task 22. The resource-specific data (RSD) field (RSD) of the resource descriptor 18 contains a native operating system pathname "/u/user/report.txt" for the resource 20 in this example.

The attributes field of the resource descriptor 18 holds an attribute DESC="my CU data." This attribute enables the resource 20 to be bound to a task-specific name using a description of the resource, i.e. DESC="my data" rather than an explicit binding to the resource descriptor 18.

Figure 2:
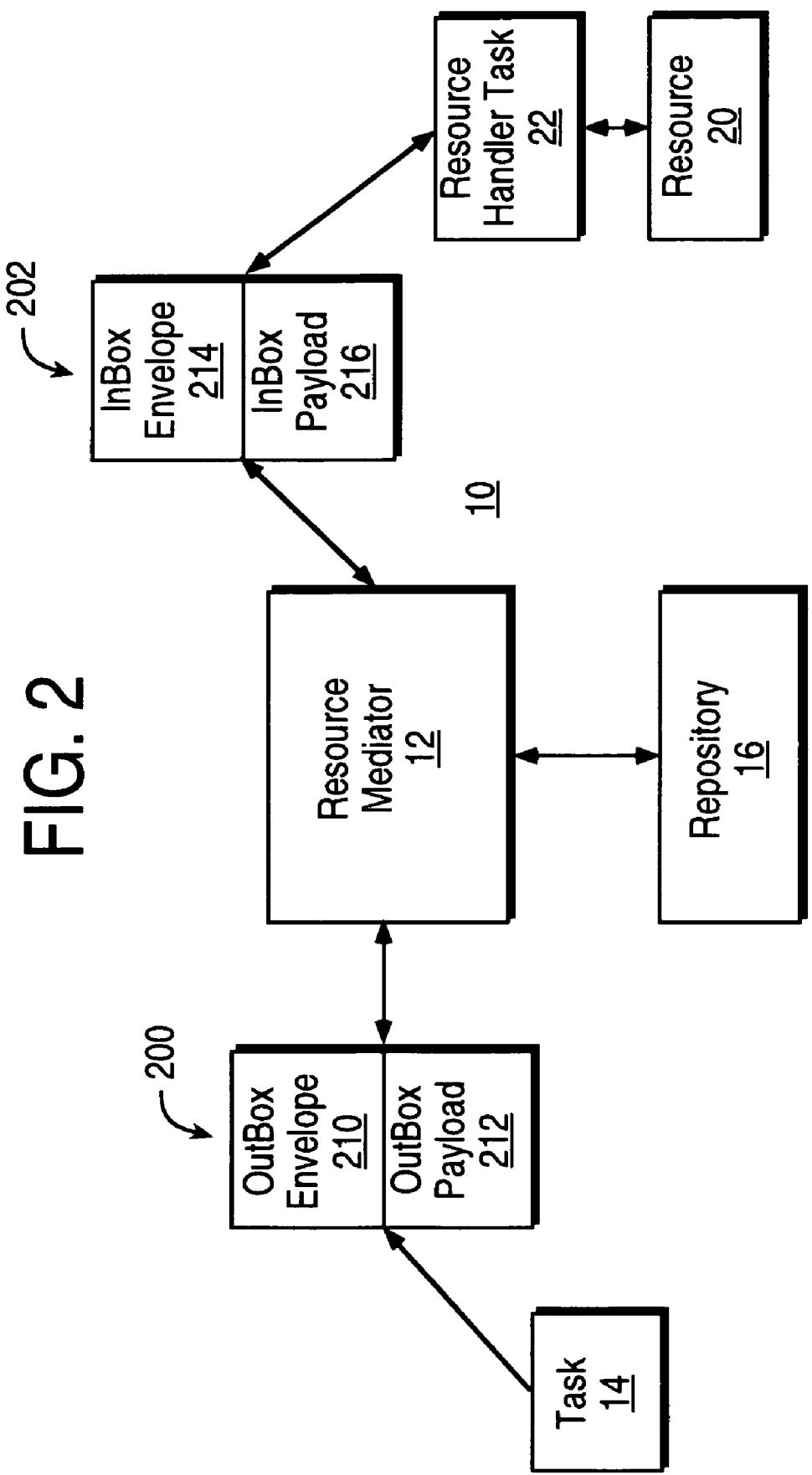
FIG. 2 shows the basic messaging structure provided by the resource mediator.

FIG. 2 shows the basic messaging structure provided by the resource mediator 12 in one embodiment. The task 14 sends a message to the resource handler task 22 by placing a message 200 in its out-box that specifies the resource 20 as a primary resource for the message 200. The message 200 includes an outbox envelope 210 and an oubtox payload 212. In response, the resource mediator 12 creates a forwarded message 202 and places the forwarded message 202 in an in-box of the resource handler task 22. The forwarded message 202 includes an inbox envelope 214 and an inbox payload 216.

Figure 3:
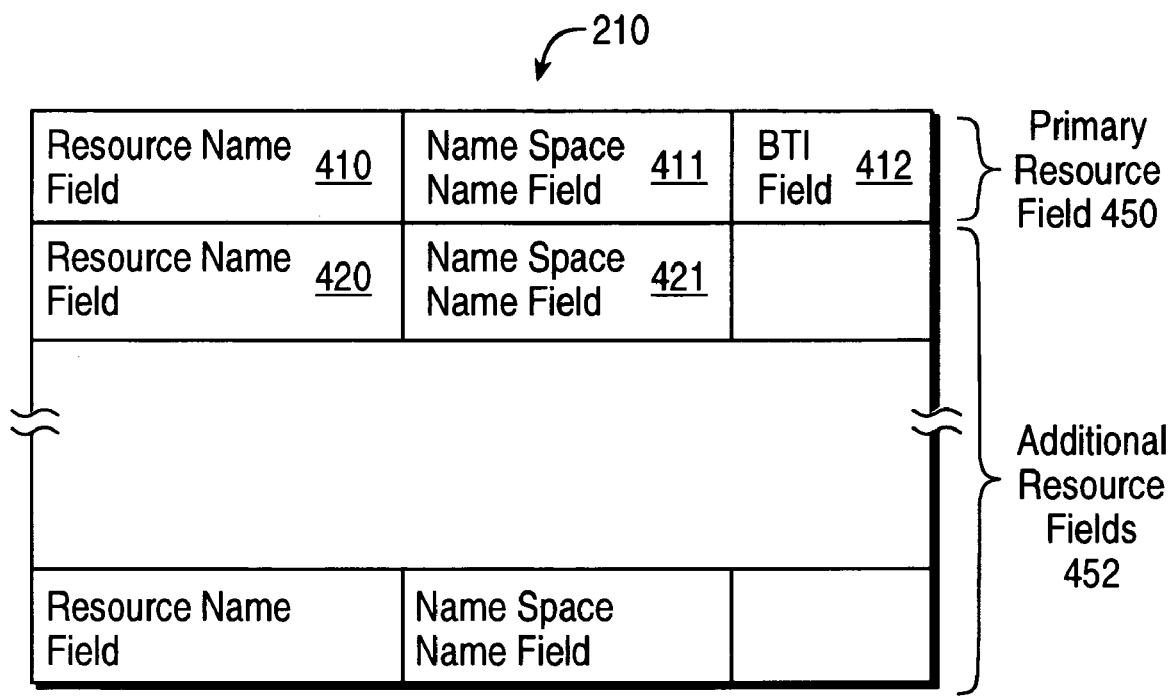
FIG. 3 illustrates an out-box envelope which includes a primary resource field and a set of additional resource fields.

FIG. 3 illustrates the out-box envelope 210 which in one embodiment includes a primary resource field 450 and a set of additional resource fields 452. The primary resource field 450 informs the resource mediator 12 as to the recipient of the message 200 and the additional resource fields 452 enable the task 14 to deliver flexible bindings for additional resources to the recipient of the message 200.

The primary resource field 450 includes a resource name field 410 for holding a task-specific name of the primary resource for the message 200 which in this example is the task-specific name 404. The primary resource field 450 also includes a name space name field 411 for holding a task-specific name of a task-specific name space which the resource mediator 12 will use to resolve the name obtained from the resource name field 410. In this example, the task-specific name in the name space name field 411 is a local name that the task 14 uses to refer to the task-specific name space 60. If no name is specified for the name space, a task-specific default name space is used. The primary resource field 450 further includes a binding-type indicator (BTI) field 412 for holding a binding-type indicator to be used by the resource mediator 12 when resolving the task-specific name contained in the resource name field 410. Alternatively, the binding-type indicator may be contained in the flexible binding 400 in, for example, the resource lookup information 402.

The resource mediator 12 reads the resource name field 410 and resolves the task-specific name 404 contained therein in the manner previously described using the task-specific name space 60 specified in the name space field 411 and the binding-type indicator specified in the BTI field 412. In this example, one of the repository_handles 1-*n* references the resource descriptor 18 for the primary resource 20. Once the resource mediator 12 obtains the resource descriptor 18 from the repository 16, it determines that the resource handler task 22 is the resource handler task for the primary resource, and then creates the forwarded message 202 and places the forwarded message 202 in an in-box of the resource handler task 22.

Each of the additional resource fields 452 includes a resource name field and a name space name field. The functions of these fields are hereinafter described for a resource name field 420 and a name space name field 421. The resource name field 420 is for holding a task-specific name of an additional resource other than the primary resource. The name space name field 421 is for holding a task-specific name of a task-specific name space from which the resource mediator 12 will obtain a flexible binding for the resource named in the resource name field 420.

The resource mediator 12 obtains the flexible binding for the task-specific name specified in the resource name field 420 from the task-specific name space specified in the name space name field 421 and writes it to the task-specific name space 62 when it delivers the forwarded message 202 to the inbox of the resource handler task 22. The resource mediator 12 also, in the example, obtains the flexible binding 400 for the task-specific name specified in the resource name field 410 from the task-specific name space 60 specified in the name space name field 411 and writes it to the task-specific name space 62 when it delivers the forwarded message 202 to the inbox of the resource handler task 22.

When delivering the forwarded message 202, the resource mediator 12 writes a set of resource name fields in the in-box envelope 214 with the task-specific names of the resources for which flexible bindings are being delivered.

The task-specific name space 60 is used to hold bindings for names which are used locally by the task 14 and have no meaning outside the task 14. Similarly, the names bound in the task-specific name space 62 are local to the resource handler task 22. In addition, the task-specific name spaces 60 and 62 are resources having corresponding resource descriptors in the repository 16. The resource mediator 12 is the resource handler for the task-specific names spaces 60 and 62 and as such creates their resource descriptors. The resource mediator 12 can control the visibility of a particular name space to particular task based on information in the resource descriptor for the particular name space.

Figure 4:
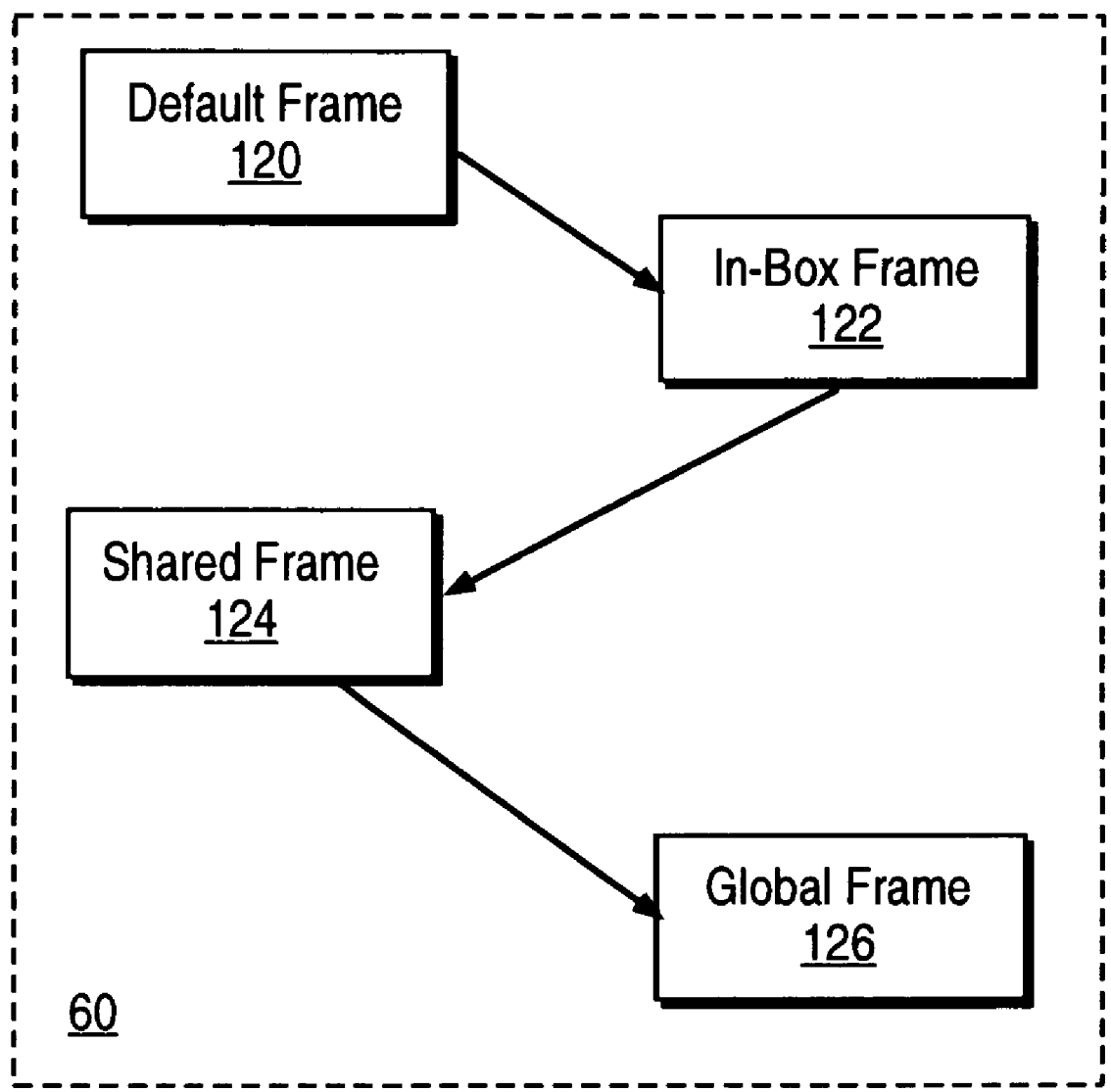
FIG. 4 shows an example structure for a task-specific name space.

FIG. 4 shows an example structure for the task-specific name space 60. The task-specific name space 60 is a structured name space which includes an ordered list of frames 120–126. Each of the frames 120–126 is a resource with a resource descriptor in the repository 16. Each of the frames 120–126 holds collections of flexible name bindings to resource descriptors in the repository 16. A names frame may also be hierarchical in nature, that is a name frame may point to another name frame or name frames that will also be searched when it is searched.

The resource mediator 12 resolves a task-specific name which the task 14 uses to refer to a resource by searching the task-specific name space 60. The resource mediator 12 first looks in the default frame 120. If no match is found then it looks in the in-box frame 122, then the shared frame 124, and then the global frame 126. If no match is found then an error is returned to the task 14.

The task 14 may have multiple task-specific name spaces allocated to it. As describe above, the task 14 specifies which task-specific name space is to be used when it transfers a message to the resource mediator 12. This enables the requesting task to maintain different names spaces for different contexts.

The structure shown enables one task to deliver name bindings to another task while avoiding name conflicts. For example, the resource handler task 22 transfers name bindings to the task 14 by providing a message to the resource mediator 12 which specifies the in-box of task 14 as the primary resource. This message contains a list of names for which name binding are to be delivered to the task 14 as described above. In response, the resource mediator 12 forwards the message to the in-box of the task 14 and places name bindings for the names contained in the message into the in-box frame 122, thereby avoiding conflicts with names contained in other frames of the task-specific name space 60. Thereafter, the task 14 can rename or move the delivered binding to another frame or task-specific name space before another binding is delivered into the in-box frame 122.

The task 14 is provided with an initial operating environment which includes a default task-specific name space. The task 14 can thereafter request that the resource mediator 12 create additional task-specific name spaces such as the task-specific name space 60. To do this, the task 14 transfers a message to the resource mediator 12 which specifies a primary resource for which the resource mediator 12 is the resource handler and which contains the ordered list of names of the frames 120–126. In response, the resource mediator 12 creates the task-specific name space 60 and the frames 120–126 and writes bindings for the frames 120–126 and the task-specific name space 60 into the default task-specific name space of the task 14. Thereafter, the task 14 can specify the task-specific name space 60 for use in resolving its task-specific names.

Figure 5:
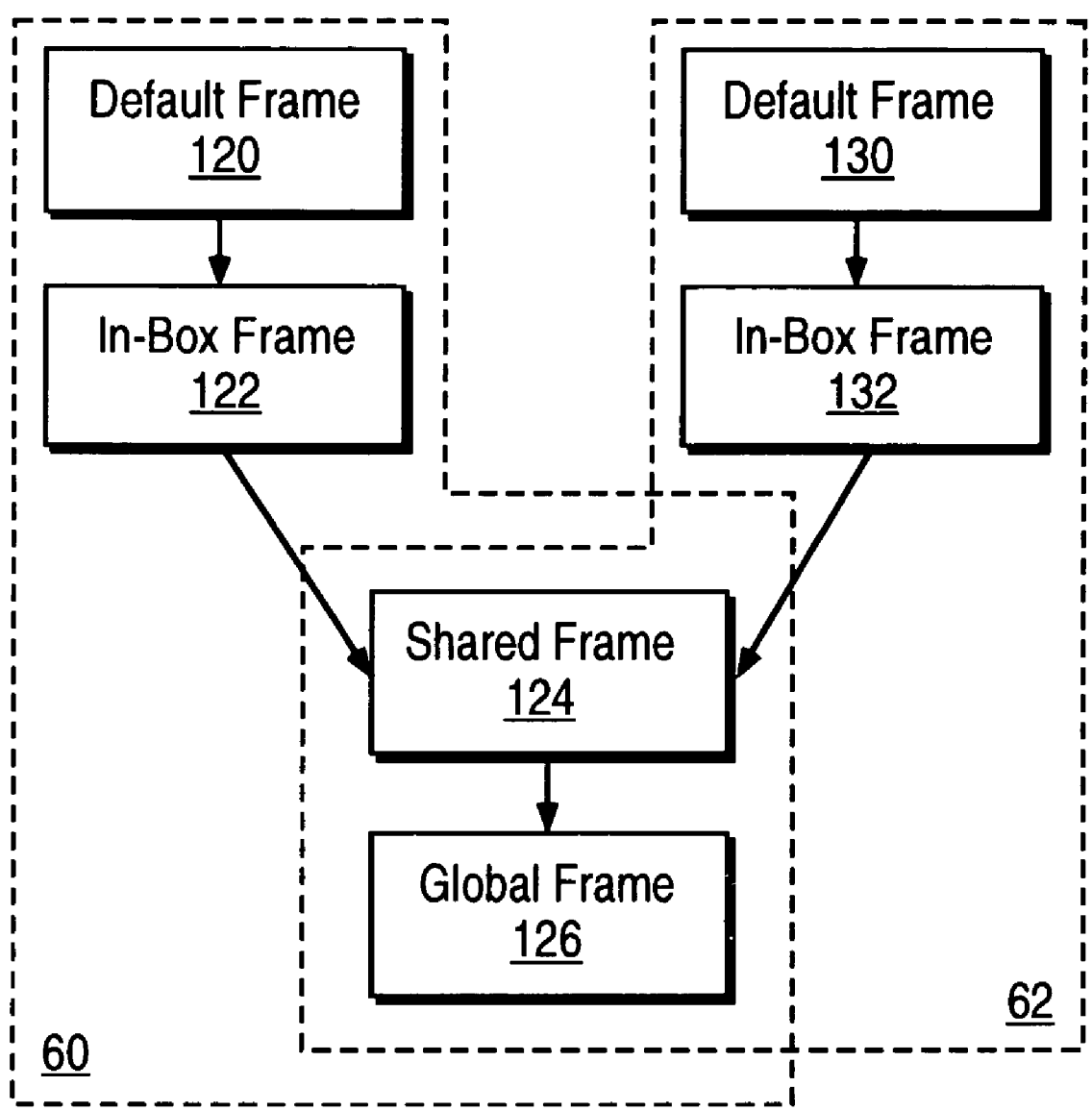
FIG. 5 shows example structures for task-specific name spaces which enable sharing of name bindings between tasks.

FIG. 5 shows example structures for the task-specific name spaces 60–62 which enable sharing of name bindings between the task 14 and the resource handler task 22. The task-specific name space 60 includes a default frame 130 and an in-box frame 132 and shares the shared frame 124 and the global frame of the task-specific name space 62. Any name binding that is placed in the shared frame 124 or the global frame 126 is visible to both the task 14 and the resource handler task 22.

The resource mediator 12 searches this structure of the task-specific name space 60 in the following order. The resource mediator 12 first looks in the default frame 120, then the in-box frame 122, then the shared frame 124, and then the global frame 126 until a match is found. If no match is found then an error is returned to the task 14. The resource mediator 12 searches the task-specific name space 62 by first searching the default frame 130, then the in-box frame 132, then the shared frame 124, and then the global frame 126 until a match is found.

As described above, the software system 10 does not assign globally unique names to resources. Instead, names are local to tasks and tasks may have differing names for the same resource or the same name for differing resources. This obviates the need for name coordination among the potentially large number of resources that may be accessible through the resource mediator 12. A common context is provided by the repository that provides translation between these independent name environments.

Before a task can issue a request for a particular resource, the particular resource must be visible to the task in its corresponding task-specific name space. One way for a particular resource to be visible to a task is when another task delivers a flexible binding for the particular resource to the task. For example, the resource handler task 22 may use a message to deliver the flexible binding 400 to the task 14 so that the resource mediator 12 writes the flexible binding 400 into the task specific name space 60 in a manner described above.

Another way for a particular resource to be visible to a task is for the task to issue a get resource message to the resource mediator 12. Since resources do not have agreed upon global names, a task requests a desired resource based not on its name but upon its attributes. The task includes a set of attributes for the desired resource in the get resource message. In response, the resource mediator 12 performs an attribute-based lookup of the repository 16 to locate resources that qualify as the desired resource by matching the attributes of the desired resource from the get resource message to attributes contained in the resource descriptors of the repository 16. The resource mediator 12 then writes a flexible binding that includes references to the matching resource descriptors into the appropriate task-specific name space of the requesting task. This allows a task to discover desired resources that are accessible via the resource mediator 12 at any time as resource owners register new resources into the repository 16.

The following is an example of a get resource message from the task 14:

get{DOC="exampledocument"}, bind to /mydocument.doc

This example get resource message specifies an attribute DOC of "exampledocument" and a binding to the name "mydocument.doc" in the task-specific name space 60 for the task 14. Although this example specifies only one attribute, (DOC="exampledocument") a get resource message in general may contain any number of attributes.

The resource mediator 12 enables the task 14 to construct a local view of the repository 16. This local view may be referred to as a repository view. The task 14 requests the creation of a repository view by placing a message in its out-box that names a primary resource for which the resource mediator 12 is the resource handler. The payload of this message may include a command to create a repository view called "mystuff" along with a list of task-specific names of resources to be placed in "mystuff." In response, the resource mediator 12 as the resource handler for this message creates a repository view called "mystuff," resolves the task-specific names contained in the message as previously described, and copies the resource descriptors from the repository 16 for the specified task-specific names to the "mystuff" repository view. Thereafter, the task 14 can specify to the resource mediator 12 that the repository view "mystuff" is to be used to process get resource messages in its out-box to the resource mediator 12. The repository view may be specified in the resource lookup information of a flexible binding.

An attribute based lookup by the resource mediator 12 to a repository view proceeds in a similar manner to an attribute based lookup to the repository 16 except that the resource descriptors examined during the lookup are only those contained in the repository view. If the resource mediator 12 does not locate an appropriate resource descriptor in the repository view during an attribute based lookup for a get resource message then it delivers a partial binding to the requesting task that originated the get resource message. The requesting task may then use the partial binding to request a completion of the binding by the resource mediator 12. The resource mediator 12 then completes the partial binding by asking the task denoted in the partial binding to do an attribute based lookup in the repository 16.

For example, assume the task 14 sends a get resource message to the resource mediator 12 which contains a set of attributes for a desired resource, a task-specific name of "mynewfile" for the desired resource, and which specifies the repository view "mystuff." If the resource mediator 12 does not match the attributes for the desired resource to any of the attributes in the resource descriptors of the repository view "mystuff" then it returns a partial binding to the task 14 in response to the get resource message. The partial binding is written by the resource mediator 12 to the task-specific name space 60 which was specified in the get resource message. The partial binding is a flexible binding that associates "mynewfile" to a reference to a resource descriptor for a resource associated with a task that will complete the partial binding and that includes the attributes for the desired resource in its resource lookup information.

The resource mediator 12 maintains flags that indicate which of the flexible bindings in the task-specific name space 60 are partial bindings. In one embodiment, the resource mediator 12 notifies the task 14 of the occurrence of a partial binding in response to the get resource message. In another embodiment, the resource mediator 12 notifies the task 14 of the partial binding in response to an attempt by the task 14 to use the partial binding to "mynewfile." Such an attempt may be, for example, an attempt to send a command to the resource handler task for "mynewfile."

The task 14 may transfer a partial binding to another task just as it would any other flexible binding. The task 14 or a recipient of the partial binding requests the completion of the partial binding using the following command:

complete{"mynewfile"}

In response, the resource mediator 12, as the resource handler for the partial binding, obtains the attributes for the desired resource from the partial binding and performs an attribute based lookup to the repository 16. The resource mediator 12 binds any resource descriptors that match to the task that requested completion. For example, if the task 14 requested completion of the partial binding then the resource mediator 12 binds any matching resource descriptors to "mynewfile" in the task-specific name space 60 using a flexible binding as previously described.

Figure 6:
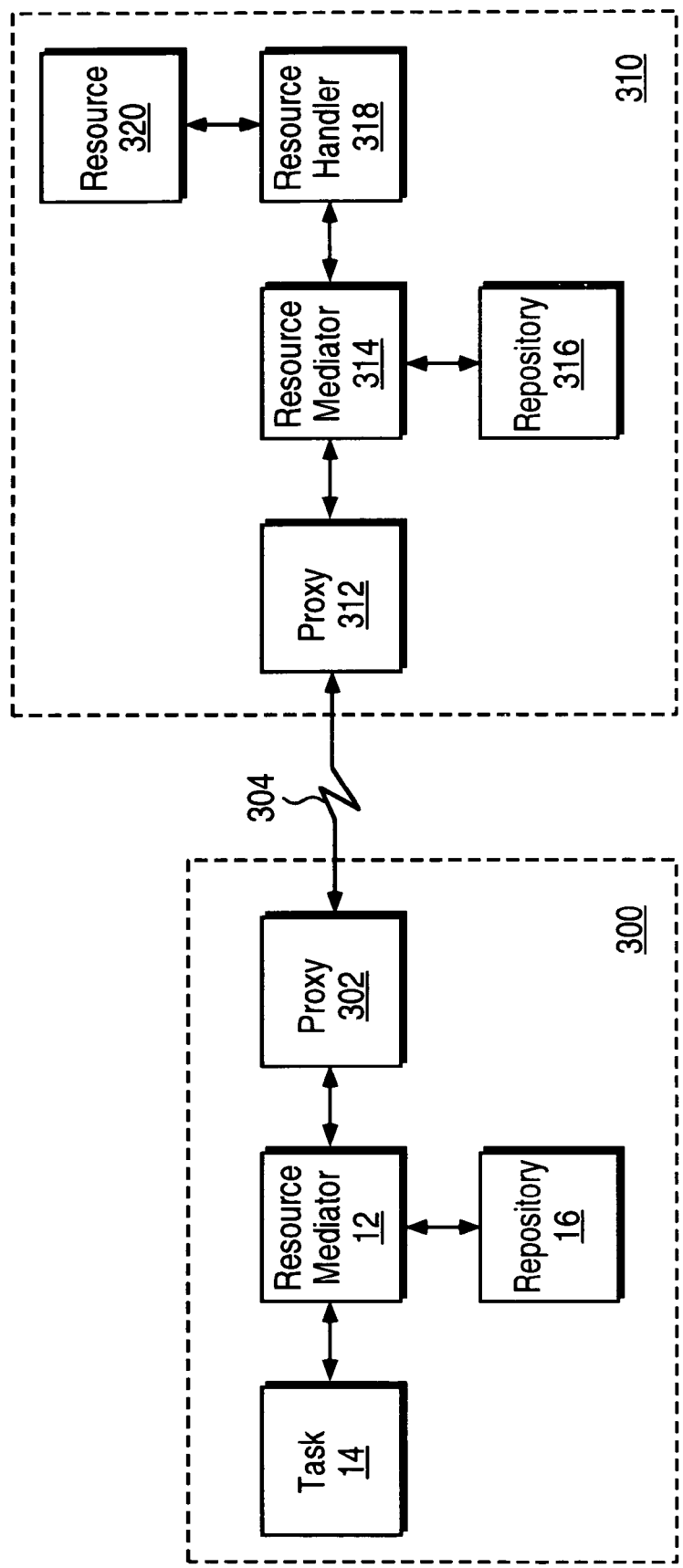
FIG. 6 shows an arrangement that enables the transfer of a partial binding to a separate computer system.

FIG. 6 shows an arrangement that enables the transfer of a partial binding to a separate computer system. A pair of computer systems 300 and 310 are shown which are interconnected via a communication link 304. The computer system 300 includes the resource mediator 12 and the repository 16. The computer system 310 includes a resource mediator 314 and a repository 316.

The computer system 310 includes a resource 320 which is to be made available to tasks executing on the computer system 300. The computer system 310 executes a proxy 312 which has a name space holding a name binding for a task-specific name for the resource 320 in a manner previously described. The proxy 312 exports the resource description for the resource 320 to a proxy 302 executing on the computer system 300. The proxies 302 and 312 communication via a communication path 304. The proxy 302 then registers the resource 320 to the resource mediator 12. The registration of the resource 320 to the resource mediator 12 creates an entry in the repository 16 that names the proxy 302 as the resource handler for the resource 320 and that includes a resource-specific data field that contains the task-specific name of the resource 320 used by the proxy 312.

The proxy 302 and the proxy 312 translate between task-specific names used by tasks on the computer system 300 and local names used by the proxy 312. A message generated by the task 14 that names the resource 320 as the primary resource is forwarded to the proxy 302 by the resource mediator 12. The resource-specific data field of this forwarded message contains the task-specific name for the resource 320 used by the proxy 312. The proxy 302 transfers the forwarded message to the proxy 312 which then generates a request message to the resource mediator 314 that names as the primary resource the task-specific name contained in the resource-specific data field of this forwarded message. In response, the resource mediator 314 forwards the forwarded message to an inbox of the resource handler 318 of the resource 320 and writes any partial bindings contained in the forwarded message into a name space associated with the resource handler 318.

A similar arrangement may be used for transferring partial bindings to resource mediators implemented on the same computer system. For example, the resource mediator 12 and the resource mediator 314 may be implemented on the same computer system with the proxy 302 and the proxy 312 translating between task-specific names associated with the resource mediators 12 and 314.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A computer system, comprising:
   a set of available resources;
   name space which corresponds to a task executing in the computer system, the name space for holding a flexible binding that binds a local name used by the task to one or more of the available resources using a description of a desired resource;
   resource mediator that obtains a message from the task which contains the local name and in response the resource mediator identifies a resource handler task for handling the message by resolving the local name using to flexible binding, wherein the message from the task includes a binding-type indicator that instructs the resource mediator whether to use a tight binding to resolve the local name if a resource descriptor corresponds to one of the available resources or to use the flexible binding if the one of the available resources is not available on resolving the local name.

2. The computer system of claim 1, wherein the flexible binding includes a reference to a resource descriptor in a repository of the computer system, wherein resource descriptors have a uniform structure for different types of available resources.

3. A computer system, comprising:
a set of available resources;
name space which corresponds to a task executing in the computer system, the name space for holding a flexible binding that binds a local name used by the task to one or more of the available resources using a description of a desired resource;
resource mediator that obtains a message from the task which contains the local name and in response the resource mediator identifies a resource handler task for handing the message by resolving the local name using an arbitration policy to select one of the available resources when plural different available resources match the description of the desired resource, wherein the flexible binding includes a binding-type indicator that informs the resource mediator of whether to use references to a resource descriptor or the description of the desired resource when resolving the local name.

4. The computer system of claim 1, wherein the binding-type indicator informs the resource mediator of whether to use references to a resource descriptor or the description of the desired resource or a combination thereof when resolving the local name.

5. The computer system of claim 4, wherein the binding-type indicator causes the resource mediator to use a tight binding when resolving the local name such that the resource mediator uses the references to resolve the local name.

6. A computer system, comprising:
a set of available resources;
name space which corresponds to a task executing in the computer system, the name space for holding a flexible binding that binds a local name used by the task to one or more of the available resources using a description of a desired resource;
resource mediator that obtains a message from the task which contains the local name and in response the resource mediator identifies a resource handler task for handling the message by resolving the local name using the flexible binding; and
a binding-type indicator that causes the resource mediator to use a tight binding to resolve the local name if any references to a resource descriptor correspond to one of available resources and to use the flexible binding otherwise such that the flexible binding is based on the description of the desired resource, wherein an arbitration policy is used to select a resource if plural different available resources are available as matching the description of the desired resource.

7. The computer system of claim 4, wherein the binding-type indicator causes the resource mediator to use a flexible binding when resolving the local name by searching the repository for a resource descriptor having a set of attributes that match the description of the desired resource.

8. The computer system of claim 4, wherein the binding-type indicator causes the resource mediator to use a flexible binding to update the references when resolving the local name by searching the repository for a resource descriptor having a set of attributes that match the description of the desired resource.

9. The computer system of claim 4, wherein the binding-type indicator causes the resource mediator to remove any of the references that correspond to resources that are not currently available when resolving a local name.

10. The computer system of claim 1, wherein the resource mediator enables the task to transfer the flexible binding to another task in the computer system.

11. The computer system of claim 1, wherein the resource mediator enables the task to transfer the flexible binding to another task in the computer system along with a set of additional flexible bindings.

12. The computer system of claim 1, wherein the message includes a primary resource field that holds the local name for the desired resource and a set of additional resource fields each of which holds a local name that the task uses to refer to an additional resource for which a flexible binding is to be delivered to the resource handler task.

13. The computer system of claim 12, wherein the primary resource field and each additional resource field includes a field for holding a local name which the task uses to refer to a name space to be used to resolve the corresponding local names.

14. The computer system of claim 12, wherein the resource handler uses a default name space associated with the task to resolve the local names in the primary resource and additional resource fields.

15. The computer system of claim 12, wherein the primary resource field includes the binding-type indicator that informs the resource mediator of how to resolve the local name in the primary resource field.

16. The computer system of claim 1, wherein the flexible binding is a partial binding that includes a reference to a resource descriptor for a resource associated with a task that will complete the partial binding.

17. The computer system of claim 16, wherein the resource mediator enables the task to transfer the partial binding to another task in the computer system which generates a request to the task that will complete the partial binding.

18. The computer system of claim 16, wherein the resource mediator enables the task to transfer the partial binding to another task in another computer system which generates a request to the task that will complete the partial binding.

19. The computer system of claim 16, wherein the name space is arranged as a structured name space with an ordered list of frames.

20. The computer system of claim 1, wherein the message specifies a repository view that holds a subset of resource descriptors contained in a repository of the computer system and the flexible binding includes a reference to a resource descriptor in the repository view for each of the one or more available resources.

21. The computer system of claim 1, wherein the message specifies a repository view that holds a subset of resource descriptors contained in a repository of the software system and the flexible binding is a partial binding that includes a reference to a resource descriptor for a resource associated with a task that will complete the partial binding.

22. A method for providing flexible bindings in a software system, comprising the steps of:
creating a name space which corresponds to a task executing in the software system;

writing a flexible binding into the name space that binds a local name used by the task to one or more of a set of available resources of the computer system using a description of a desired resource;

obtaining a message from the tack which contains the local name and in response identifying a resource handler task for handling the message by resolving the local name using the flexible binding;

using a binding-type indicator to specify one of flexible binding or tight binding; and using an arbitration policy to select a resource if more than one resource matches the description of the desired resource.

23. The method of claim 22, wherein the step of resolving the local name comprises the step of resolving the local name using a reference to a resource descriptor in a repository of the software system for each of the one or more available resources which is included in the flexible binding in response to the binding-type indicator in the message that specifies the tight binding.

24. The method of claim 22, wherein the step of resolving the local name comprises the steps of:
   resolving the local name using a reference to a resource descriptor in a repository of the software system for each of the one or more available resources if any of the references are included in the flexible binding;
   resolving the local name using the description of the desired resource if none of the references are included in the flexible binding.

25. The method of claim 22, wherein the step of resolving the local name comprises the step of searching a repository in the software system for a resource descriptor having a set of attributes that match the description of the desired resource in response to the binding-type indicator in the message that specifies the flexible binding.

26. The method of claim 22, wherein the step of resolving the local name comprises the steps of:
   searching a repository in the software system for a resource descriptor having a set of attributes that match the description of the desired resource;
   updating a list in the flexible binding of references to resource descriptors in the repository that match the description of the desired resource.

27. The method of claim 22, wherein the step of resolving the local name comprises the step of removing from a list in the flexible binding any references to resource descriptors in a repository of the software system that correspond to resources that are not currently available.

28. The method of claim 22, further comprising the step of transferring the flexible binding to another task in the software system in response to the message from the task.

29. The method of claim 22, further comprising the step of transferring a set of additional flexible bindings to another task in the software system in response to the message from the task.

30. The method of claim 22, wherein the message specifies a name space that holds the flexible binding.

31. The method of claim 22, wherein the flexible binding is contained in a default name space associated with the task.

32. The method of claim 22, wherein the flexible binding is a partial binding that includes a reference to a resource descriptor in a repository of the software system for a resource associated with a task that will complete the partial binding.

33. The method of claim 32, further comprising the step of transferring the partial binding to another task in the software system which generates a request to the task that will complete the partial binding.

34. The method of claim 32, further comprising the step of transferring the partial binding to another task in another software system which generates a request to the task that will complete the partial binding.

35. The method of claim 22, wherein the step of resolving the local name comprises the step of resolving the local name using a reference to a resource descriptor in a repository of the software system for each of the one or more available resources in the flexible binding in response to the binding-type indicator in the message that specifies the a tight binding and using a specified arbitration policy to select one of the references.

36. The system of claim 1, wherein the binding-type indicator includes an indication to remove tight bindings that are not currently available when resolving the local name.

* * * * *